(12) United States Patent
Chen (10) Patent No.: US 8,890,014 B1
(45) Date of Patent: Nov. 18, 2014

(54) LUMINOUS KEYBOARD AND LIGHT GUIDE PLATE MODULE THEREOF

(71) Applicant: Primax Electronics Ltd., Taipei (TW)

(72) Inventor: Bo-An Chen, Taipei (TW)

(73) Assignee: Primax Electronics Ltd., Neihu (TW)

( * ) Notice: Subject to any disclaimer, the term of this patent is extended or adjusted under 35 U.S.C. 154(b) by 0 days.

(21) Appl. No.: 14/050,112

(22) Filed: Oct. 9, 2013

(30) Foreign Application Priority Data

Jul. 19, 2013 (TW) .............................. 102125930 A (51) Int. Cl.
*H01H 13/83* (2006.01)
*F21V 8/00* (2006.01)

(52) U.S. Cl.
CPC ..................................... *G02B 6/0011* (2013.01)
USPC ........... 200/314; 200/310; 362/24; 362/23.03

(58) Field of Classification Search
USPC ............... 362/23.03, 235, 611; 200/300, 314, 200/317, 341, 344, 517
See application file for complete search history.

(56) References Cited

U.S. PATENT DOCUMENTS

| 7,709,760 | B2 * | 5/2010 | Chen et al. | 200/314 |
| 2011/0158728 | A1 * | 6/2011 | Ho et al. | 400/472 |
| 2013/0093606 | A1 * | 4/2013 | Chen | 341/22 |
| 2013/0134021 | A1 * | 5/2013 | Chen | 200/5 A |
| 2014/0138230 | A1 * | 5/2014 | Chen | 200/5 A |
| 2014/0168934 | A1 * | 6/2014 | Chen | 362/23.03 |

* cited by examiner

*Primary Examiner* — Tracie Y Green
(74) *Attorney, Agent, or Firm* — Kirton McConkie; Evan R. Witt (57) ABSTRACT

A luminous keyboard includes a light-emitting element, a membrane wiring board, plural keys, and a light guide plate module. The plural keys are used for correspondingly triggering the plural membrane switches. The light-emitting element is used for providing the light beam to the luminous keyboard. The light guide plate module includes a first reflective layer, a second reflective layer, and a light-guiding layer between the first reflective layer and the second reflective layer. The light-guiding layer includes plural light-outputting regions and a spacing region. The plural light-outputting regions are aligned with the plural keys, respectively. The spacing region is arranged around the plural light-outputting regions. Moreover, plural light-guiding dots are located at the plural light-outputting regions, and at least one light diffusion structure is located at the spacing region.

23 Claims, 9 Drawing Sheets

LUMINOUS KEYBOARD AND LIGHT GUIDE PLATE MODULE THEREOF

FIELD OF THE INVENTION

The present invention relates to a keyboard, and more particularly to a luminous keyboard with an illuminating function.

BACKGROUND OF THE INVENTION

Recently, with the increasing development of information industries, portable information devices such as notebook computers, mobile phones or personal digital assistants are widely used in many instances. In case that a portable information device is used in a dim environment, the numbers and the characters marked on the keys of the keyboard of the portable information device are not clearly visible. In other words, the dim environment becomes hindrance from operating the keyboard. In addition, if the numbers and the characters marked on the keys of the keyboard are reluctantly viewed in the dim environment, the user is readily suffered from vision impairment. For solving these drawbacks, a luminous keyboard has been introduced into the market. The luminous keyboard can be used in the dim environment in order to enhance the applications thereof. Moreover, by changing the luminous layout of the luminous keyboard, the information device having the luminous keyboard is more aesthetically-pleasing and thus the competitiveness thereof is enhanced.

Figure 1:
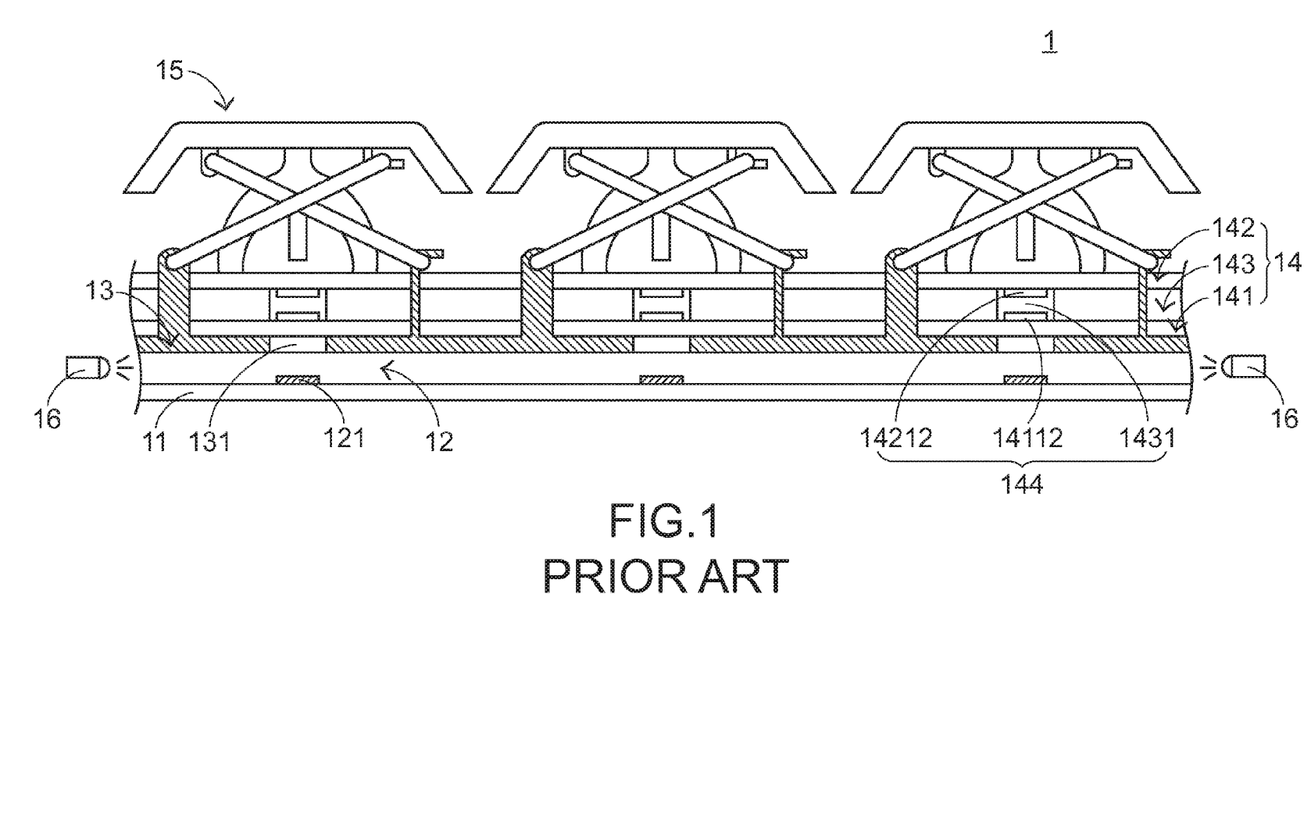
FIG. 1 is a schematic cross-sectional view illustrating a conventional luminous keyboard.
Figure 2:
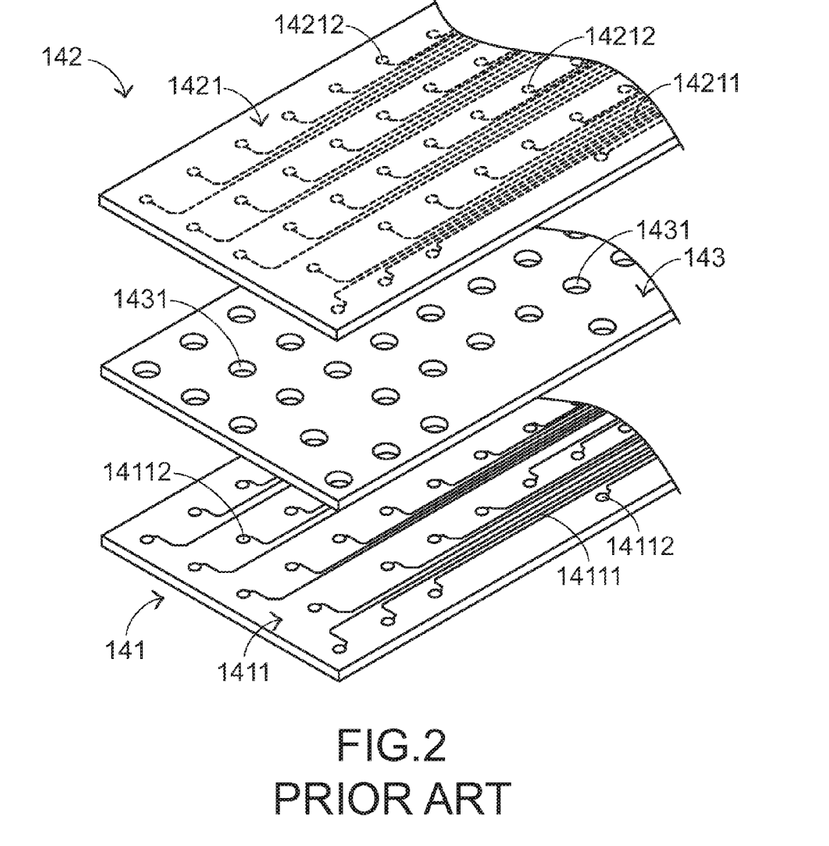
FIG. 2 is a schematic perspective view illustrating a membrane wiring board and a keyboard circuit board of the conventional luminous keyboard of FIG. 1.
Figure 3:
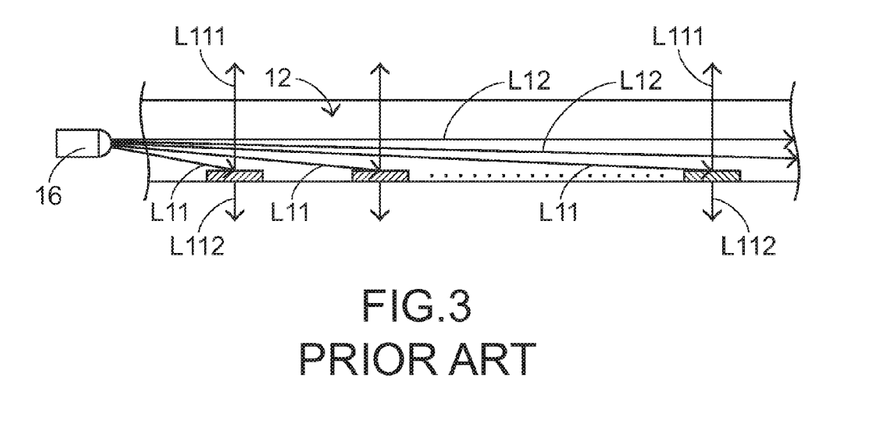
FIG. 3 schematically illustrates optical paths within a light guide plate of the membrane wiring board of the conventional luminous keyboard of FIG. 1.

FIG. 1 is a schematic cross-sectional view illustrating a conventional luminous keyboard. FIG. 2 is a schematic perspective view illustrating a membrane wiring board and a keyboard circuit board of the conventional luminous keyboard of FIG. 1. FIG. 3 schematically illustrates optical paths within a light guide plate of the membrane wiring board of the conventional luminous keyboard of FIG. 1. As shown in FIGS. 1, 2 and 3, the conventional luminous keyboard 1 comprises a reflective plate 11, a light guide plate 12, a metallic supporting plate 13, a membrane wiring board 14, plural keys 15, and at least one light-emitting element 16. The membrane wiring board 14 comprises a lower wiring plate 141, an upper wiring plate 142, and an intermediate plate 143. The intermediate plate 143 is arranged between the lower wiring plate 141 and the upper wiring plate 142. The lower wiring plate 141, the intermediate plate 143 and the upper wiring plate 142 are all made of a transparent material.

The lower wiring plate 141 comprises a first circuit pattern 1411. The first circuit pattern 1411 comprises plural silver paste conductor lines 14111 and plural lower contacts 14112. The upper wiring plate 142 comprises a second circuit pattern 1421. The second circuit pattern 1421 comprises plural silver paste conductor lines 14211 and plural upper contacts 14212. The intermediate plate 143 comprises plural perforations 1431 corresponding to the plural lower contacts 14112 and the plural upper contacts 14212, respectively. Each of the upper contacts 14212 and the corresponding lower contact 14112 are collectively defined as a membrane switch 144.

The metallic supporting plate 13 is disposed under the membrane wiring board 14 for connecting the plural keys 15. In addition, the metallic supporting plate 13 comprises plural supporting plate openings 131 corresponding to the plural keys 15. Each of the keys 15 is disposed over a corresponding membrane switch 144. As any key 15 is depressed and moved downwardly, the corresponding membrane switch 144 is pushed by the key 15, and thus the corresponding membrane switch 144 is electrically conducted. Under this circumstance, the luminous keyboard 1 generates a corresponding key signal.

Moreover, the light-emitting element 16 is located at a lateral side of the light guide plate 12 for emitting a light beam into the light guide plate 12. The light guide plate 12 is disposed on the reflective plate 11. Moreover, plural light-guiding dots 121 are formed on a bottom surface of the light guide plate 12 for collecting and scattering the light beams. The light-guiding dots 121 are aligned with corresponding keys 15. After the light beam is introduced into the light guide plate 12, the light beam is diffused within the whole light guide plate 12. A portion L11 of the light beam is projected onto the light-guiding dots 121. Due to the ink properties of the light-guiding dots 121, the portion L11 of the light beam will be scattered upwardly and downwardly. The portion of the light beam that is scattered upwardly (L111) will be sequentially transmitted through the plural supporting plate openings 131 of the metallic supporting plate 13 and the membrane wiring board 14 and then projected to the plural keys 15. The portion of the light beam that is scattered downwardly (L112) will be reflected by the reflective plate 11, and the reflected light beam L112 is directed upwardly. Consequently, the light beam provided by the light-emitting element 16 can be well utilized. Under this circumstance, the purpose of illuminating the plural keys 15 is achieved.

However, the conventional luminous keyboard 1 still has some drawbacks. For example, after the light beam is introduced into the light guide plate 12, since the incidence angle of a portion L12 of the light beam is very small, the advancing direction of the portion L12 of the light beam is substantially in parallel with an optical axis of the light-emitting element 16. In other words, the portion L12 of the light beam fails to be projected onto the light-guiding dots 121. Under this circumstance, the portion L12 of the light beam fails to be guided from the light guide plate 12 to the plural keys 15, and thus the light utilization efficiency of the conventional luminous keyboard 1 is usually unsatisfied.

Therefore, there is a need of providing an improved luminous keyboard in order to eliminate the above drawbacks.

SUMMARY OF THE INVENTION

The present invention relates to a luminous keyboard, and more particularly to a luminous keyboard with enhanced light utilization efficiency.

In accordance with an aspect of the present invention, there is provided a luminous keyboard. The luminous keyboard includes a membrane wiring board, plural keys, a light guide plate module, and at least one light-emitting element. The membrane wiring board includes plural membrane switches. The plural keys are used for correspondingly triggering the plural membrane switches. The light guide plate module is disposed under the membrane wiring board. The light guide plate module includes a light-guiding layer, a first reflective layer, and a second reflective layer. The light-guiding layer includes plural light-outputting regions and a spacing region. The plural light-outputting regions are aligned with respective keys, and the spacing region is arranged around the plural light-outputting regions. Moreover, plural light-guiding dots are located at the plural light-outputting regions, and at least one light diffusion structure is located at the spacing region. The first reflective layer is disposed over the light-guiding layer, and includes plural light-transmissible regions corresponding to the plural light-guiding dots, respectively. The second reflective layer is disposed under the light-guiding layer. The at least one light-emitting element is used for providing a light beam to the light-guiding layer. When the light beam is projected onto the at least one light diffusion structure, the light beam is scattered by the at least one light diffusion structure, and the scattered light beam is advanced within a space between the first reflective layer and the second reflective layer. When the scattered light beam is projected onto one of the light-guiding dots, the light beam is directed to the corresponding light-outputting region of the plural light-outputting regions, so that the light beam is transmitted through the corresponding light-outputting region and directed to the corresponding key.

In accordance with another aspect of the present invention, there is provided a luminous keyboard. The luminous keyboard includes a membrane wiring board, plural keys, and at least one light-emitting element. The membrane wiring board includes a lower wiring plate, an upper wiring plate, and an intermediate plate. The lower wiring plate has a first circuit pattern. The first circuit pattern includes plural lower contacts. The upper wiring plate has a second circuit pattern. The second circuit pattern includes plural upper contacts corresponding to the plural lower contacts. Each of the upper contacts and the corresponding lower contact are separated from each other by a spacing distance. In addition, each of the upper contacts and the corresponding lower contact are collaboratively defined as the corresponding membrane switch. The intermediate plate is arranged between the upper wiring plate and the lower wiring plate, so that each of the upper contacts and the corresponding lower contact are separated from each other by the spacing distance. The intermediate plate includes plural perforations corresponding to the plural lower contacts and the plural upper contacts, respectively. The plural keys are used for correspondingly triggering the plural membrane switches. The at least one light-emitting element is used for providing a light beam to the membrane wiring board. Moreover, a light-guiding layer, a first reflective layer and a second reflective layer are arranged between the lower wiring plate and the upper wiring plate. The light-guiding layer includes plural light-outputting regions and a spacing region. The plural light-outputting regions are aligned with the plural keys, respectively. The spacing region is arranged around the plural light-outputting regions. Moreover, plural light-guiding dots are located at the plural light-outputting regions, and at least one light diffusion structure is located at the spacing region. The first reflective layer is disposed over the light-guiding layer, and includes plural light-transmissible regions corresponding to the plural light-guiding dots, respectively. The second reflective layer is disposed under the light-guiding layer. When the light beam is projected onto the at least one light diffusion structure, the light beam is scattered by the at least one light diffusion structure, and the scattered light beam is advanced within a space between the first reflective layer and the second reflective layer. When the scattered light beam is projected onto one of the light-guiding dots, the light beam is directed to the corresponding light-outputting region of the plural light-outputting regions, so that the light beam is transmitted through the corresponding light-outputting region and directed to the corresponding key.

In accordance with a further aspect of the present invention, there is provided a light guide plate module for a luminous keyboard. The light guide plate module includes a light-guiding layer, a first reflective layer, and a second reflective layer. The light-guiding layer includes plural light-outputting regions and a spacing region. The spacing region is arranged around the plural light-outputting regions. In addition, plural light-guiding dots are located at the plural light-outputting regions, and at least one light diffusion structure is located at the spacing region. The first reflective layer is disposed over the light-guiding layer, and includes plural light-transmissible regions corresponding to the plural light-guiding dots, respectively. The second reflective layer is disposed under the light-guiding layer. When the light beam is projected onto the at least one light diffusion structure, the light beam is scattered by the at least one light diffusion structure, and the scattered light beam is advanced within a space between the first reflective layer and the second reflective layer. When the scattered light beam is projected onto one of the light-guiding dots, the light beam is directed to the corresponding light-outputting region of the plural light-outputting regions, so that the light beam is transmitted through the corresponding light-outputting region and outputted from the light guide plate module.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 4:
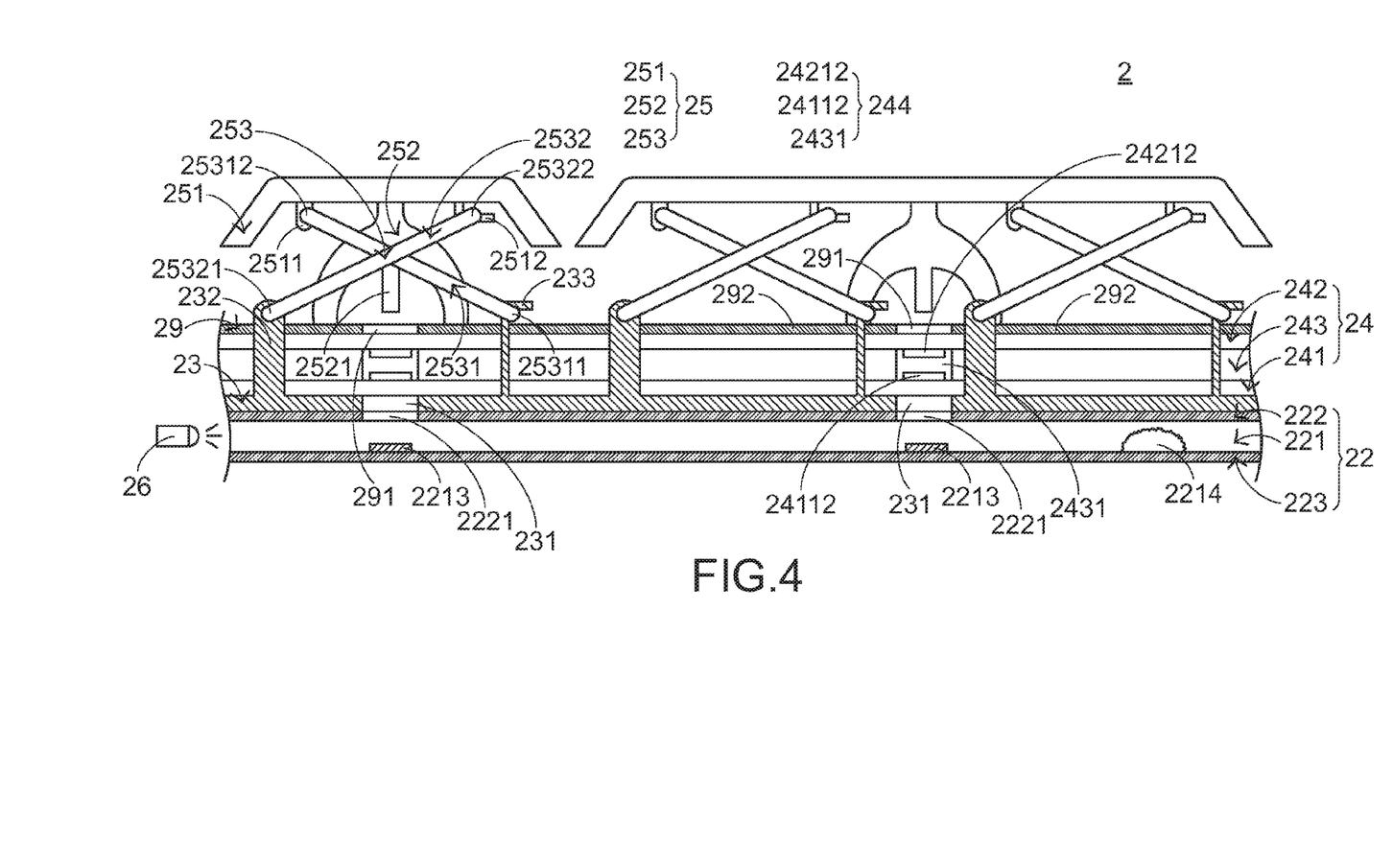
FIG. 4 is a schematic side view illustrating a luminous keyboard according to a first embodiment of the present invention.
Figure 5:
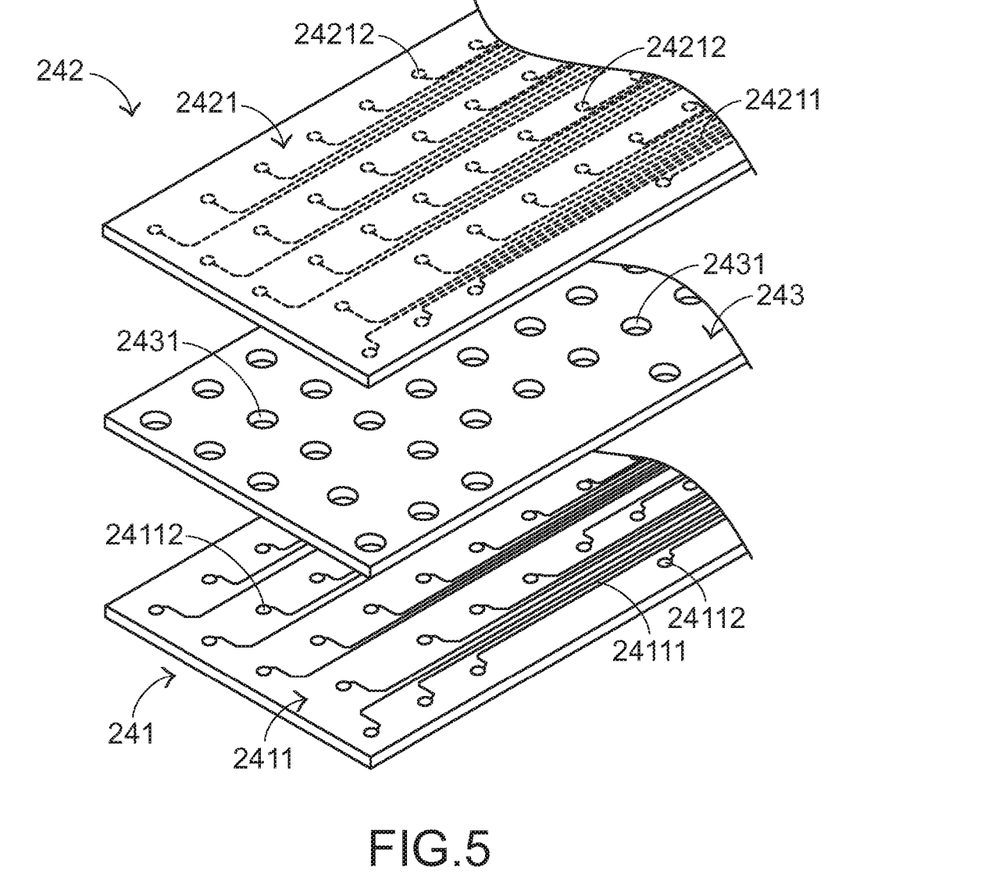
FIG. 5 is a schematic perspective view illustrating a membrane wiring board and a keyboard circuit board of the luminous keyboard of FIG. 4.
Figure 6:
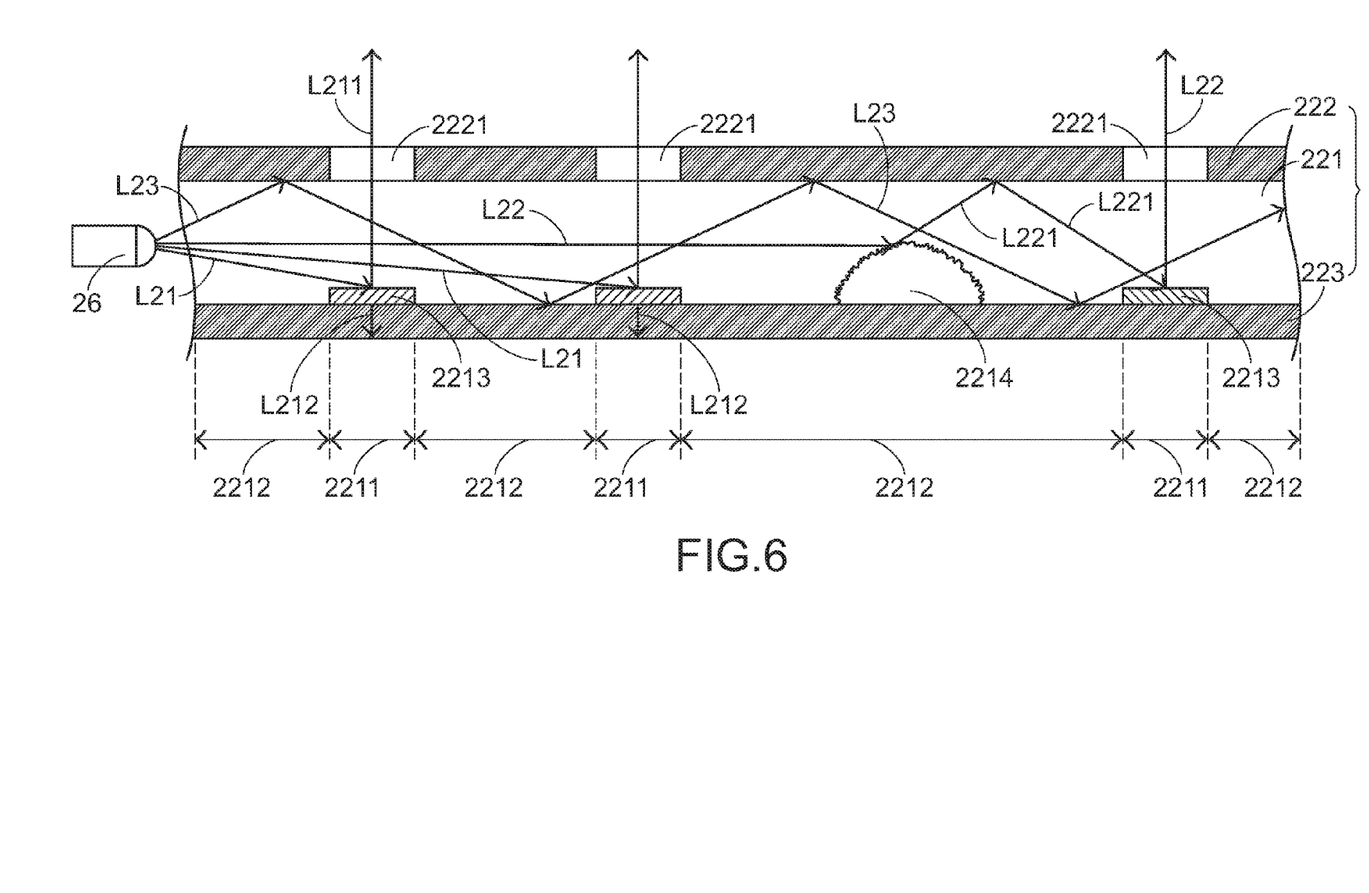
FIG. 6 schematically illustrates optical paths within a light guide plate module of the membrane wiring board of the luminous keyboard of FIG. 4.

Please refer to FIGS. 4-6. FIG. 4 is a schematic side view illustrating a luminous keyboard according to a first embodiment of the present invention. FIG. 5 is a schematic perspective view illustrating a membrane wiring board and a keyboard circuit board of the luminous keyboard of FIG. 4. FIG. 6 schematically illustrates optical paths within a light guide plate module of the membrane wiring board of the luminous keyboard of FIG. 4. From bottom to top, a light guide plate module 22, a metallic supporting plate 23, a membrane wiring board 24, a fixing layer 29 and plural keys 25 of the luminous keyboard 2 are sequentially shown. The luminous keyboard 2 further comprises a light-emitting element 26.

The light-emitting element 26 is located at a lateral side of the light guide plate module 22. In this embodiment, the light-emitting element 26 is a light emitting diode, but is not limited thereto.

The membrane wiring board 24 comprises a lower wiring plate 241 and an upper wiring plate 242. A first circuit pattern 2411 is formed on a top surface of the lower wiring plate 241. The first circuit pattern 2411 comprises plural silver paste conductor lines 24111 and plural lower contacts 24112. A second circuit pattern 2421 is formed on a bottom surface of the upper wiring plate 242. The second circuit pattern 2421 comprises plural silver paste conductor lines 24211 and plural upper contacts 24212. The plural upper contacts 24212 are aligned with the plural lower contacts 24112, respectively. Each of the upper contacts 24212 and the corresponding lower contact 24112 are separated from each other by a spacing distance. Moreover, each of the upper contacts 24212 and the corresponding lower contact 24112 are collectively defined as a membrane switch 244. For allowing each of the upper contacts 24212 and the corresponding lower contact 24112 to be separated from each other by the spacing distance, the membrane wiring board 24 further comprises an intermediate plate 243. The intermediate plate 243 is arranged between the lower wiring plate 241 and the upper wiring plate 242. The intermediate plate 243 comprises plural perforations 2431 corresponding to the plural lower contacts 24112 and the plural upper contacts 24212, respectively.

The metallic supporting plate 23 is used for connecting the plural keys 25. In addition, the metallic supporting plate 23 comprises plural supporting plate openings 231 corresponding to the plural keys 25. The plural keys 25 are aligned with corresponding membrane switches 244. Each key 25 comprises a keycap 251 and a connecting element 253. The connecting element 253 is arranged between the metallic supporting plate 23 and the corresponding keycap 251 for connecting the metallic supporting plate 23 and the corresponding keycap 251. Moreover, due to the connecting element 253, the keycap 251 is movable upwardly or downwardly relative to the metallic supporting plate 23.

In this embodiment, the connecting element 253 is a scissors-type connecting element. Moreover, the scissors-type connecting element 253 comprises a first frame 2531 and a second frame 2532. The metallic supporting plate 23 further comprises a first fixing structure 232 and a second fixing structure 233. Each of the plural keys 25 further comprises an elastic element 252. The elastic element 252 is fixed on the fixing layer 29, and arranged between the corresponding keycap 251 and the fixing layer 29. Moreover, the elastic element 252 has a sustaining part 2521. The keycap 251 of each key 25 comprises a first keycap connecting structure 2511 and a second keycap connecting structure 2512.

A first end 25311 of the first frame 2531 is connected to the second fixing structure 233, and a second end 25312 of the first frame 2531 is connected to the first keycap connecting structure 2511. In addition, a first end 25321 of the second frame 2532 is connected to the first fixing structure 232, and a second end 25322 of the second frame 2532 is connected to the second keycap connecting structure 2512. It is noted that the connection relationships between the connecting element 253, the metallic supporting plate 23 and the keycap 251 are presented herein for purpose of illustration and description only.

Moreover, as any key 25 is depressed and moved downwardly relative to the membrane wiring board 24, the first frame 2531 and the second frame 2532 of the corresponding connecting element 253 are switched from an open-scissors state to a folded state. Moreover, in response to the downward movement of the keycap 251, the corresponding elastic element 252 is compressed by the keycap 251, and the corresponding upper contact 24212 is pushed by the sustaining part 2521 of the elastic element 252. Consequently, the corresponding upper contact 24212 is contacted with the corresponding lower contact 24112 through the corresponding perforation 2431, and the corresponding membrane switch 244 is electrically conducted. Under this circumstance, the membrane wiring board 24 generates a corresponding key signal. Moreover, when the depressing force exerted on the key 25 is eliminated, the keycap 251 is moved upwardly relative to the membrane wiring board 24 in response to the elastic force of the elastic element 252. Under this circumstance, the first frame 2531 and the second frame 2532 are switched from the folded state to the open-scissors state, and the keycap 251 is returned to its original position.

The spirits of the present invention will be illustrated as follows. The light guide plate module 22 comprises a light-guiding layer 221, a first reflective layer 222, and a second reflective layer 223. The first reflective layer 222 is disposed over the light-guiding layer 221. The second reflective layer 223 is disposed under the light-guiding layer 221. The light-guiding layer 221 comprises plural light-outputting regions 2211 and a spacing region 2212. The plural light-outputting regions 2211 are aligned with the plural keys 25, respectively. The spacing region 2212 is arranged around the plural light-outputting regions 2211. Moreover, a light-guiding dot 2213 is located at each of the plural light-outputting regions 2211. Moreover, at least one light diffusion structure 2214 is located at the spacing region 2212. The first reflective layer 222 comprises plural light-transmissible regions 2221 corresponding to the plural light-guiding dots 2213, respectively.

Moreover, in this embodiment, the light-guiding layer 221 is made of polyethylene terephthalate (PET), polycarbonate (PC), thermoplastic polyurethane (TPU) or polymethylmethacrylate (PMMA). Moreover, the first reflective layer 222 is a black film layer made of polyethylene terephthalate (PET) or a black light-shading layer formed on a top surface of the light-guiding layer 221. Moreover, the light-transmissible regions 2221 of the first reflective layer 222 may be openings or non-black transparent blocks, but are not limited thereto. The light diffusion structure 2214 is embedded upwardly into the light-guiding layer 221. In addition, the light diffusion structure 2214 is a microstructure with a specified thickness. For example, the microstructure is a V-cut structure, a texturing structure or a micro lens structure. The light diffusion structure 2214 may be formed in the light-guiding layer 221 by a compression process.

After the light beam provided by the light-emitting element 26 is introduced into the light guide plate module 22, a portion L23 of the light beam is not projected onto the light-guiding dots 2213. Consequently, the portion L23 of the light beam is continuously advanced within the light-guiding layer 221 (i.e. within the space between the first reflective layer 222 and the second reflective layer 223) by total internal reflection, and diffused within the whole light-guiding layer 221. On the other hand, another portion L21 of the light beam is projected onto the light-guiding dots 2213. Due to the ink properties of the light-guiding dots 2213, the portion L21 of the light beam will be scattered upwardly and downwardly. The portion of the light beam that is scattered upwardly (L211) will be sequentially transmitted through the light-transmissible regions 2221 of the first reflective layer 222, the supporting plate openings 231 of the metallic supporting plate 23, the membrane wiring board 24 and the fixing layer 29, and projected to the plural keys 25. In addition, the portion of the light beam that is scattered upwardly (L211) is outputted from light-outputting regions (not shown) of the keycaps 251. For example, the light-outputting regions of the keycaps 251 are symbol regions, number regions or character regions. Consequently, the luminous keyboard 2 can be operated by the user in a dim environment. The portion of the light beam that is scattered downwardly (L212) will be reflected by the second reflective layer 223. In addition, the reflected portion L212 of the light beam is directed upwardly, and introduced into the light-guiding layer 221 again. Consequently, the portion of the light beam that is scattered downwardly (L212) can be well utilized.

Moreover, after the light beam from the light-emitting element 26 is introduced into the light guide plate module 22, a portion L22 of the light beam is substantially in parallel with an optical axis of the light-emitting element 26. That is, the incidence angle of the portion L22 of the light beam to be introduced into the light-guiding layer 221 is very small. Consequently, the portion L22 of the light beam may be projected onto the light diffusion structure 2214 and scattered by the light diffusion structure 2214. The scattered portion L221 of the light beam is continuously advanced within the light-guiding layer 221 (i.e. within the space between the first reflective layer 222 and the second reflective layer 223) by total internal reflection. That is, when the portion L22 of the light beam which is substantially in parallel with the optical axis of the light-emitting element 26 is projected onto the light diffusion structure 2214, the advancing direction of the portion L22 of the light beam is changed. Consequently, in the later advancing process of the light beam, the probability of allowing the portion L22 of the light beam to be projected onto the light-guiding dots 2213 and outputted from the light-guiding layer 221 will be largely increased. Under this circumstance, the light intensity of the light-outputting region (not shown) of the corresponding keycap 251 is increased, and thus the light utilization efficiency of the luminous keyboard 2 is enhanced.

Figure 7:
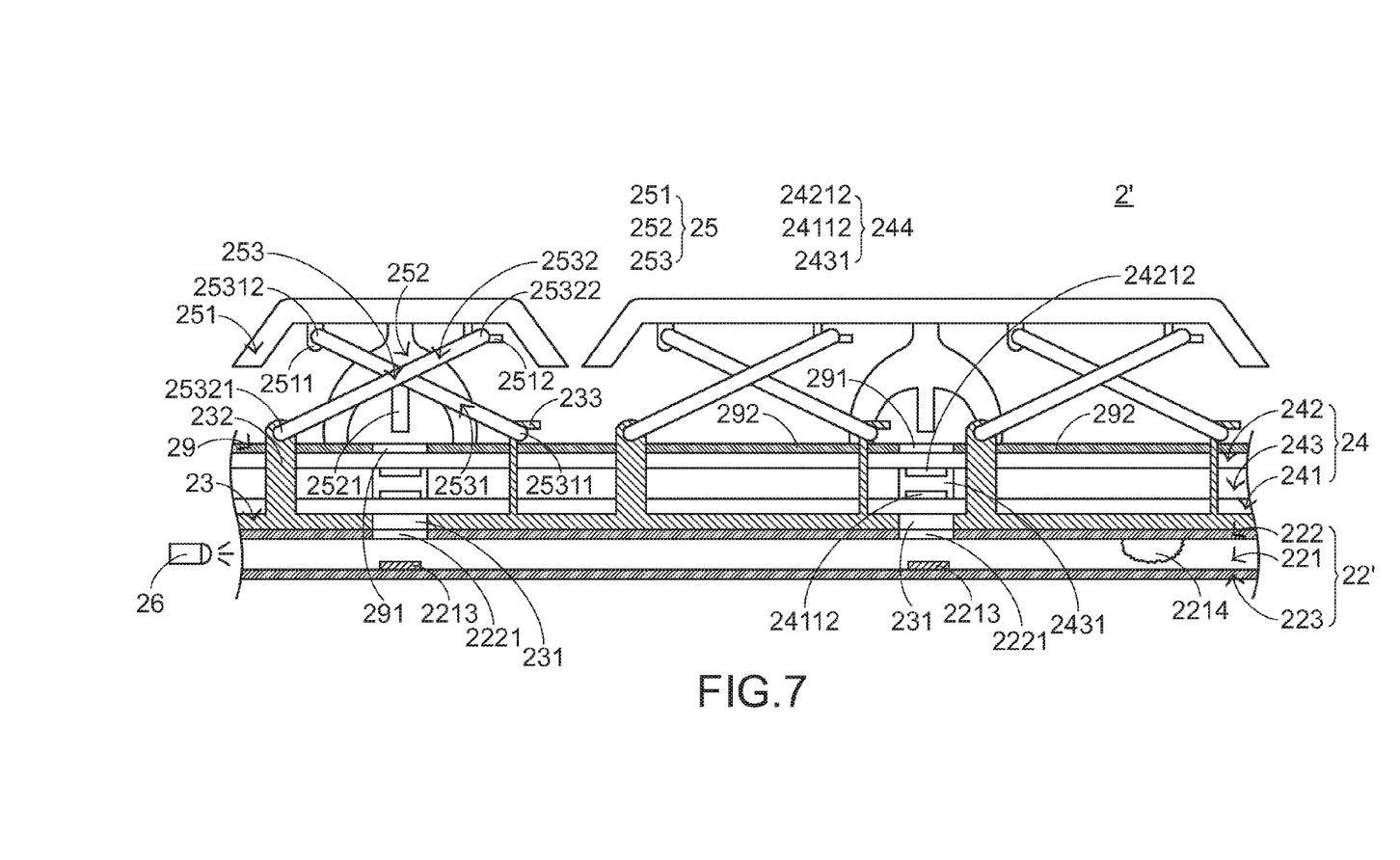
FIG. 7 is a schematic side view illustrating a luminous keyboard according to a second embodiment of the present invention.

FIG. 7 is a schematic side view illustrating a luminous keyboard according to a second embodiment of the present invention. Except for the following items, the assembled structures of the luminous keyboard 2' of this embodiment are substantially identical to those of the luminous keyboard 2 of the first embodiment, and are not redundantly described herein. In comparison with the luminous keyboard 2 of the first embodiment, the light diffusion structure 2214 of the light guide plate module 22 of the luminous keyboard 2' of this embodiment is embedded downwardly into the light-guiding layer 221. In addition, the light diffusion structure 2214 comprises a microstructure with a specified thickness. Under this circumstance, the light utilization efficiency of the luminous keyboard 2' is also enhanced.

Those skilled in the art will readily observe that the light diffusion structure 2214 embedded downwardly into the light-guiding layer 221 and having a specified thickness may be applied to the luminous keyboards of the following embodiments while retaining the teachings of the second embodiment of the present invention.

Figure 8:
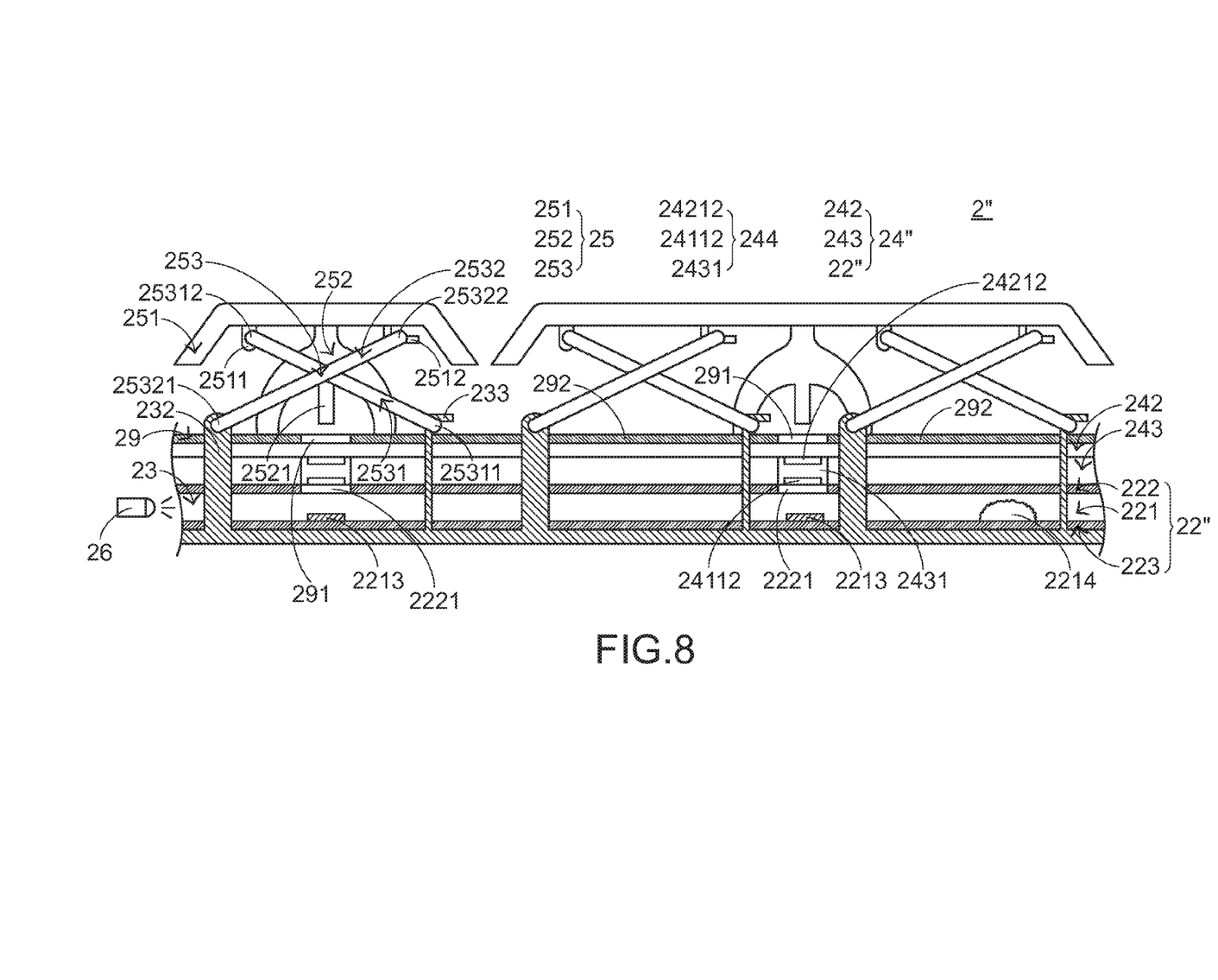
FIG. 8 is a schematic side view illustrating a luminous keyboard according to a third embodiment of the present invention.

FIG. 8 is a schematic side view illustrating a luminous keyboard according to a third embodiment of the present invention. Except for the following items, the assembled structures of the luminous keyboard 2" of this embodiment are substantially identical to those of the luminous keyboard 2 of the first embodiment, and are not redundantly described herein. In comparison with the luminous keyboard 2 of the first embodiment, the light guide plate module 22" of the luminous keyboard 2" of this embodiment is directly used as the lower wiring plate of the membrane wiring board 24". That is, the first circuit pattern is directly formed on the light guide plate module 22". Under this circumstance, the lower wiring plate of the membrane wiring board 24" has the light-guiding function. In comparison with the luminous keyboard 2, the thickness of the luminous keyboard 2" is smaller.

Figure 9:
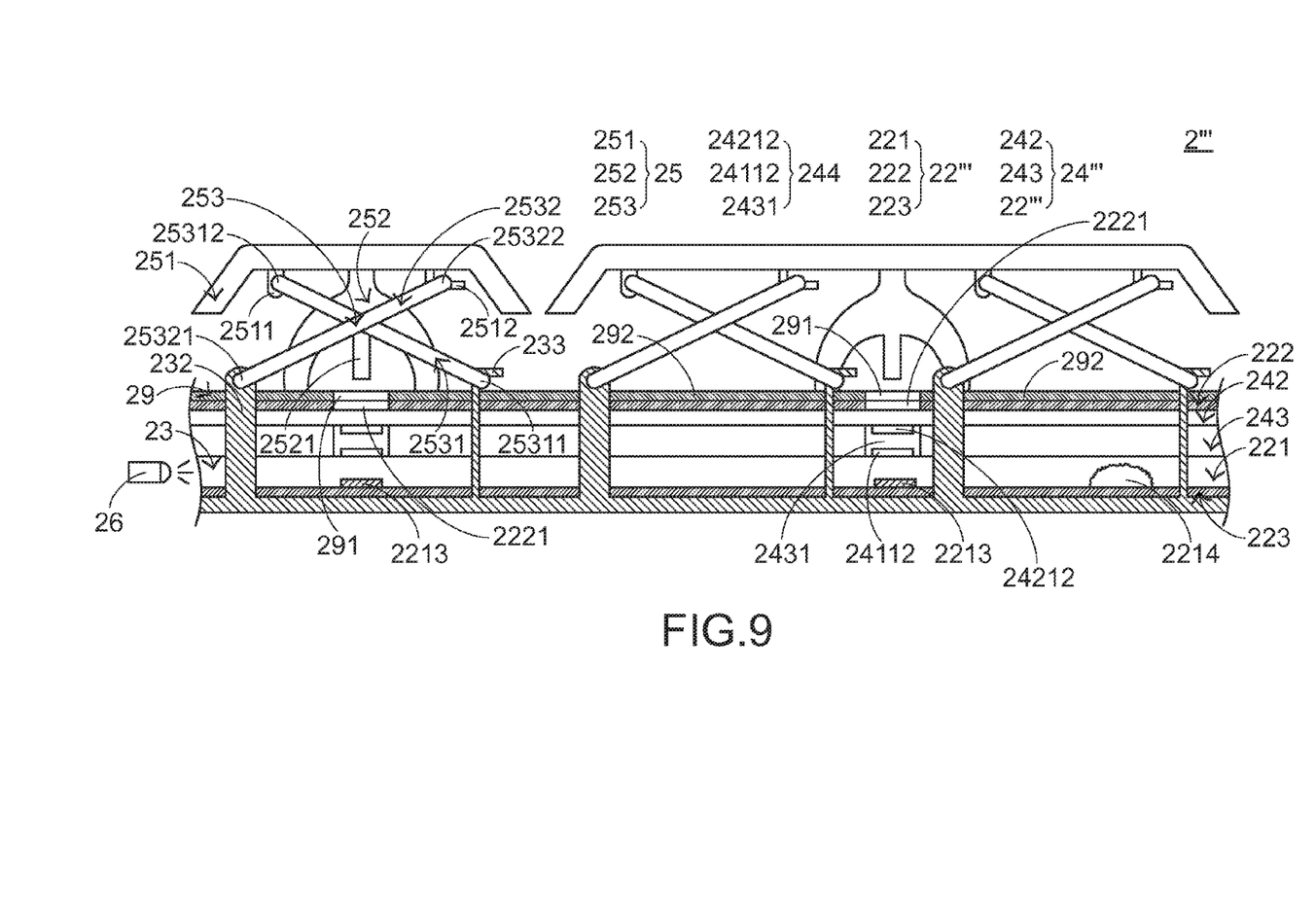
FIG. 9 is a schematic side view illustrating a luminous keyboard according to a fourth embodiment of the present invention.

FIG. 9 is a schematic side view illustrating a luminous keyboard according to a fourth embodiment of the present invention. Except for the following items, the assembled structures of the luminous keyboard 2''' of this embodiment are substantially identical to those of the luminous keyboard 2" of the third embodiment, and are not redundantly described herein. In comparison with the luminous keyboard 2" of the third embodiment, the light-guiding layer 221 and the second reflective layer 223 of the light guide plate module 22''' of the luminous keyboard 2''' of this embodiment are directly used as the lower wiring plate of the membrane wiring board 24'''. Moreover, the upper wiring plate of the membrane wiring board 24''' further comprises the first reflective layer 222 of the light guide plate module 22'''. In this embodiment, the first reflective layer 222 is a reflective ink layer, which is formed on the upper wiring plate of the membrane wiring board 24'''. In comparison with the luminous keyboard 2" of the third embodiment, the thickness of the luminous keyboard 2''' of this embodiment is smaller.

Figure 10:
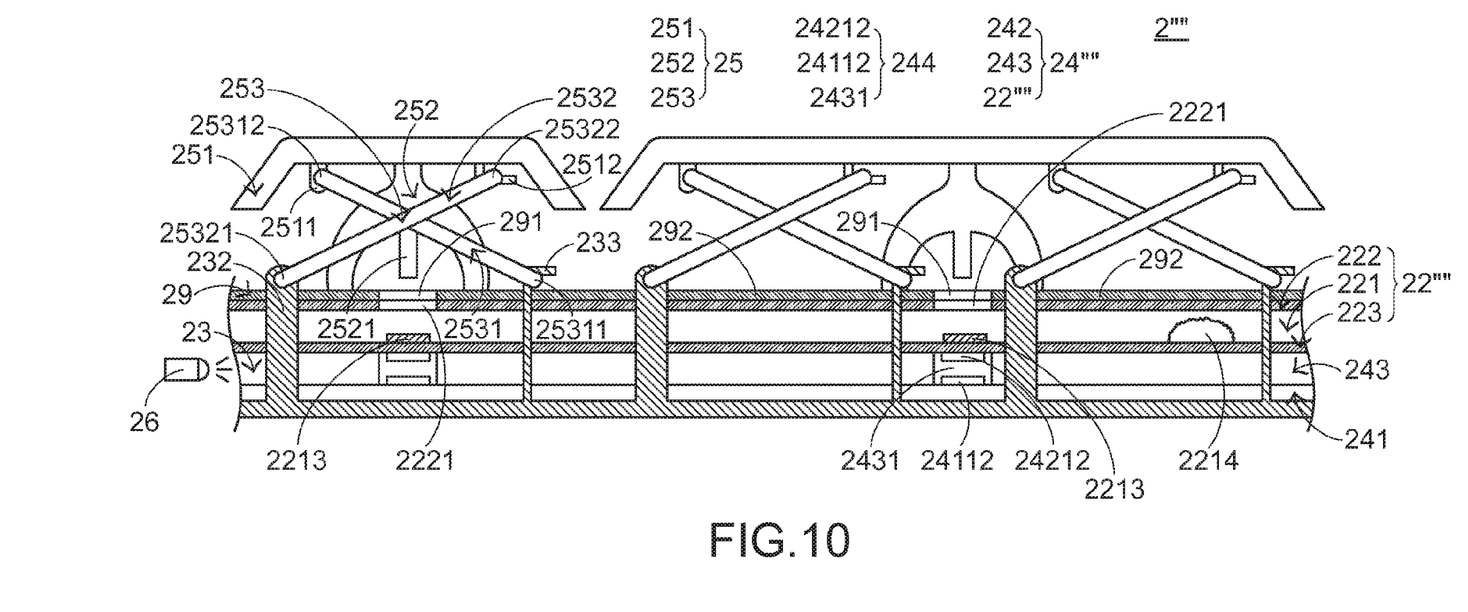
FIG. 10 is a schematic side view illustrating a luminous keyboard according to a fifth embodiment of the present invention.

FIG. 10 is a schematic side view illustrating a luminous keyboard according to a fifth embodiment of the present invention. Except for the following items, the assembled structures of the luminous keyboard 2'''' of this embodiment are substantially identical to those of the luminous keyboard 2 of the first embodiment, and are not redundantly described herein. In comparison with the luminous keyboard 2 of the first embodiment, the light guide plate module 22'''' of the luminous keyboard 2'''' is directly used as the upper wiring plate of the membrane wiring board 24''''. That is, the second circuit pattern is directly formed on the light guide plate module 22''''. Under this circumstance, the upper wiring plate of the membrane wiring board 24'''' has the light-guiding function. In comparison with the luminous keyboard 2, the thickness of the luminous keyboard 2" is smaller.

The above applications of the light guide plate module are presented herein for purpose of illustration and description only. However, those skilled in the art will readily observe that numerous modifications and alterations may be made according to the practical requirements. For example, in some embodiments, the light guide plate module may be applied to various electronic devices requiring the backlight function. For example, the electronic device is a mobile phone, a television or a tablet personal computer.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A luminous keyboard, comprising:
a membrane wiring board comprising plural membrane switches;
plural keys for correspondingly triggering the plural membrane switches,
a light guide plate module disposed under the membrane wiring board, wherein the light guide plate module comprises:
a light-guiding layer comprising plural light-outputting regions and a spacing region, wherein the plural light-outputting regions are aligned with respective keys, and the spacing region is arranged around the plural light-outputting regions, wherein plural light-guiding dots are located at the plural light-outputting regions, and at least one light diffusion structure is located at the spacing region;

a first reflective layer disposed over the light-guiding layer, and comprising plural light-transmissible regions corresponding to the plural light-guiding dots, respectively; and a second reflective layer disposed under the light-guiding layer; and at least one light-emitting element for providing a light beam to the light-guiding layer, wherein when the light beam is projected onto the at least one light diffusion structure, the light beam is scattered by the at least one light diffusion structure, and the scattered light beam is advanced within a space between the first reflective layer and the second reflective layer, wherein when the scattered light beam is projected onto one of the light-guiding dots, the light beam is directed to the corresponding light-outputting region of the plural light-outputting regions, so that the light beam is transmitted through the corresponding light-outputting region and directed to the corresponding key.

2. The luminous keyboard according to claim 1, wherein the light diffusion structure is a microstructure.

3. The luminous keyboard according to claim 2, wherein the microstructure is a V-cut structure, a texturing structure or a micro lens structure.

4. The luminous keyboard according to claim 1, wherein the at least one light diffusion structure is embedded into the light-guiding layer by a compression process.

5. The luminous keyboard according to claim 1, wherein the first reflective layer is a film layer made of polyethylene terephthalate (PET) or a light-shading layer formed on a top surface of the light-guiding layer.

6. The luminous keyboard according to claim 1, wherein the membrane wiring board comprises:

a lower wiring plate having a first circuit pattern, wherein the first circuit pattern comprises plural lower contacts; and an upper wiring plate having a second circuit pattern, wherein the second circuit pattern comprises plural upper contacts corresponding to the plural lower contacts, wherein each of the upper contacts and the corresponding lower contact are separated from each other by a spacing distance, and each of the upper contacts and the corresponding lower contact are collaboratively defined as the corresponding membrane switch.

7. The luminous keyboard according to claim 6, wherein the membrane wiring board further comprises an intermediate plate, wherein the intermediate plate is arranged between the upper wiring plate and the lower wiring plate, so that each of the upper contacts and the corresponding lower contact are separated from each other by the spacing distance, wherein the intermediate plate comprises plural perforations corresponding to the plural lower contacts and the plural upper contacts, respectively.

8. The luminous keyboard according to claim 1, further comprising a metallic supporting plate for connecting the plural keys, wherein the metallic supporting plate comprises plural supporting plate openings corresponding to the plural keys, wherein the metallic supporting plate is arranged between the membrane wiring board and the plural keys, or the metallic supporting plate is arranged between the membrane wiring board and the light guide plate module.

9. The luminous keyboard according to claim 8, wherein each of the plural keys comprises:

a keycap exposed outside the luminous keyboard; and a connecting element arranged between the metallic supporting plate and the keycap for connecting the metallic supporting plate and the keycap, and allowing the keycap to be moved upwardly or downwardly relative to the metallic supporting plate.

10. The luminous keyboard according to claim 9, wherein each of the plural keys comprises an elastic element, the elastic element is arranged between the keycap and the metallic supporting plate, and the elastic element has a sustaining part, wherein the connecting element is a scissors-type connecting element, wherein when the keycap is depressed, the elastic element is compressed, so that the corresponding membrane switch is pushed by the sustaining part, wherein when the keycap is not depressed, the keycap is returned to an original position in response to an elastic force provided by the elastic element.

11. A luminous keyboard, comprising:

a membrane wiring board comprising:

a lower wiring plate having a first circuit pattern, wherein the first circuit pattern comprises plural lower contacts;

an upper wiring plate having a second circuit pattern, wherein the second circuit pattern comprises plural upper contacts corresponding to the plural lower contacts, wherein each of the upper contacts and the corresponding lower contact are separated from each other by a spacing distance, and each of the upper contacts and the corresponding lower contact are collaboratively defined as the corresponding membrane switch; and an intermediate plate arranged between the upper wiring plate and the lower wiring plate, so that each of the upper contacts and the corresponding lower contact are separated from each other by the spacing distance, wherein the intermediate plate comprises plural perforations corresponding to the plural lower contacts and the plural upper contacts, respectively;

plural keys for correspondingly triggering the plural membrane switches; and at least one light-emitting element for providing a light beam to the membrane wiring board, wherein a light-guiding layer, a first reflective layer and a second reflective layer are arranged between the lower wiring plate and the upper wiring plate, wherein the light-guiding layer comprises plural light-outputting regions and a spacing region, wherein the plural light-outputting regions are aligned with the plural keys, respectively, and the spacing region is arranged around the plural light-outputting regions, wherein plural light-guiding dots are located at the plural light-outputting regions, and at least one light diffusion structure is located at the spacing region, wherein the first reflective layer is disposed over the light-guiding layer, and comprises plural light-transmissible regions corresponding to the plural light-guiding dots, respectively, wherein the second reflective layer is disposed under the light-guiding layer, wherein when the light beam is projected onto the at least one light diffusion structure, the light beam is scattered by the at least one light diffusion structure, and the scattered light beam is advanced within a space between the first reflective layer and the second reflective layer, wherein when the scattered light beam is projected onto one of the light-guiding dots, the light beam is directed to the corresponding light-outputting region of the plural light-outputting regions, so that the light beam is transmitted through the corresponding light-outputting region and directed to the corresponding key.

12. The luminous keyboard according to claim 11, wherein the light diffusion structure is a microstructure.

13. The luminous keyboard according to claim 12, wherein the microstructure is a V-cut structure, a texturing structure or a micro lens structure.

14. The luminous keyboard according to claim 11, wherein the at least one light diffusion structure is embedded into the light-guiding layer by a compression process.

15. The luminous keyboard according to claim 11, wherein the first reflective layer is a film layer made of polyethylene terephthalate (PET) or a light-shading layer formed on a top surface of the light-guiding layer.

16. The luminous keyboard according to claim 11, further comprising a metallic supporting plate for connecting the plural keys, wherein the metallic supporting plate comprises plural supporting plate openings corresponding to the plural keys, wherein the metallic supporting plate is arranged between the membrane wiring board and the plural keys, or the metallic supporting plate is arranged between the membrane wiring board and the light guide plate module.

17. The luminous keyboard according to claim 16, wherein each of the plural keys comprises:
a keycap exposed outside the luminous keyboard; and
a connecting element arranged between the metallic supporting plate and the keycap for connecting the metallic supporting plate and the keycap, and allowing the keycap to be moved upwardly or downwardly relative to the metallic supporting plate.

18. The luminous keyboard according to claim 17, wherein each of the plural keys comprises an elastic element, the elastic element is arranged between the keycap and the metallic supporting plate, and the elastic element has a sustaining part, wherein the connecting element is a scissors-type connecting element, wherein when the keycap is depressed, the elastic element is compressed, so that the corresponding membrane switch is pushed by the sustaining part, wherein when the keycap is not depressed, the keycap is returned to an original position in response to an elastic force provided by the elastic element.

19. A light guide plate module for a luminous keyboard, the light guide plate module comprising:
a light-guiding layer comprising plural light-outputting regions and a spacing region, wherein the spacing region is arranged around the plural light-outputting regions, wherein plural light-guiding dots are located at the plural light-outputting regions, and at least one light diffusion structure is located at the spacing region;
a first reflective layer disposed over the light-guiding layer, and comprising plural light-transmissible regions corresponding to the plural light-guiding dots, respectively; and
a second reflective layer disposed under the light-guiding layer,
wherein when the light beam is projected onto the at least one light diffusion structure, the light beam is scattered by the at least one light diffusion structure, and the scattered light beam is advanced within a space between the first reflective layer and the second reflective layer, wherein when the scattered light beam is projected onto one of the light-guiding dots, the light beam is directed to the corresponding light-outputting region of the plural light-outputting regions, so that the light beam is transmitted through the corresponding light-outputting region and outputted from the light guide plate module.

20. The light guide plate module according to claim 19, wherein the light diffusion structure is a microstructure.

21. The light guide plate module according to claim 20, wherein the microstructure is a V-cut structure, a texturing structure or a micro lens structure.

22. The light guide plate module according to claim 19, wherein the at least one light diffusion structure is embedded into the light-guiding layer by a compression process.

23. The light guide plate module according to claim 19, wherein the first reflective layer is a film layer made of polyethylene terephthalate (PET) or a light-shading layer formed on a top surface of the light-guiding layer.

* * * * *